United States Patent
Griffith et al.

(10) Patent No.: US 11,698,471 B2
(45) Date of Patent: Jul. 11, 2023

(54) METHOD FOR PREDICTING SUBSURFACE FEATURES FROM SEISMIC USING DEEP LEARNING DIMENSIONALITY REDUCTION FOR REGRESSION

(71) Applicant: SHELL OIL COMPANY, Houston, TX (US)

(72) Inventors: Donald Paul Griffith, Houston, TX (US); Sam Ahmad Zamanian, Houston, TX (US); Russell David Potter, Houston, TX (US)

(73) Assignee: SHELL USA, INC., Houston, TX (US)

( * ) Notice: Subject to any disclaimer, the term of this patent is extended or adjusted under 35 U.S.C. 154(b) by 61 days.

(21) Appl. No.: 17/275,309

(22) PCT Filed: Sep. 10, 2019

(86) PCT No.: PCT/EP2019/074086
§ 371 (c)(1),
(2) Date: Mar. 11, 2021

(87) PCT Pub. No.: WO2020/053199
PCT Pub. Date: Mar. 19, 2020

(65) Prior Publication Data
US 2022/0113441 A1    Apr. 14, 2022

Related U.S. Application Data

(60) Provisional application No. 62/730,773, filed on Sep. 13, 2018.

(51) Int. Cl.
*G01V 1/30* (2006.01)
*G06N 3/084* (2023.01)

(52) U.S. Cl.
CPC ............ *G01V 1/307* (2013.01); *G06N 3/084* (2013.01); *G01V 2210/63* (2013.01)

(58) Field of Classification Search
CPC .... G01V 1/307; G01V 2210/63; G01V 1/302; G01V 1/308; G01V 2210/612;
(Continued)

(56) References Cited

U.S. PATENT DOCUMENTS 10,614,618 B2 * 4/2020 Griffith .................. G06T 19/20
2011/0270591 A1 * 11/2011 Couet ................... G06N 3/048
703/2

(Continued)

FOREIGN PATENT DOCUMENTS

CN    109086773 A    12/2018
WO    2018026995 A1    2/2018

OTHER PUBLICATIONS

Waldeland et al., "Convolutional neural networks for automated seismic interpretation", The Leading Edge, vol. 37, No. 7, Jul. 1, 2018 (Jul. 1, 2018), pp. 529-537, XP055607330 (Year: 2018).*

(Continued)

*Primary Examiner* — Mohammad K Islam
(74) *Attorney, Agent, or Firm* — Shell USA, Inc.

(57) ABSTRACT

A method for training a backpropagation-enabled regression process is used for predicting values of an attribute of subsurface data. A multi-dimensional seismic data set with an input dimension of at least two is inputted into a backpropagation-enabled process. A predicted value of the attribute has a prediction dimension of at least 1 and is at least 1 dimension less than the input dimension.

19 Claims, 3 Drawing Sheets

(58) Field of Classification Search
CPC ......... G01V 2210/64; G01V 2210/641; G01V 2210/642; G06N 3/084
See application file for complete search history.

(56) References Cited

U.S. PATENT DOCUMENTS

2013/0175030 A1* 7/2013 Ige .................. G05B 15/02 700/282
2019/0064389 A1 2/2019 Denli et al.

OTHER PUBLICATIONS

Ying Jiang, "Detecting geological structures in seismic volumes using deep convolutional neural networks",, Feb. 22, 2017 (Feb. 22, 2017) (Year: 2017).*

Lei Huang et al, "A scalable deep learning platform for identifying geologic features from seismic attributes", The Leading Edge, vol. 36, No. 3, Mar. 30, 2017 (Mar. 30, 2017), pp. 249-256 (Year: 2017).*

International Search Report and Written Opinion received for PCT Patent Application No. PCT/EP2019/074086, dated Dec. 10, 2019, 11 pages.

Huang et al., "A Scalable Deep Learning Platform for Identifying Geologic Features From Seismic Attributes", the Leading Edge, vol. 36, Issue No. 3, Mar. 30, 2017, pp. 249-256, XP055474335.

Waldeland et al., "Convolutional Neural Networks for Automated Seismic Interpretation", the Leading Edge, vol. 37, Issue No. 7, Jul. 1, 2018, pp. 529-537, XP055607330.

Waldeland et al., "Salt Classification Using Deep Learning", 79th EAGE Conference and Exhibition 2017, Jun. 12-15, 2017, pages.

Jiang, "Detecting Geological Structures in Seismic Volumes Using Deep Convolutional Neural Networks", The Leading Edge, Master Thesis, Matriculation No. 350785, Feb. 22, 2017, 76 pages, XP055523502.

* cited by examiner

METHOD FOR PREDICTING SUBSURFACE FEATURES FROM SEISMIC USING DEEP LEARNING DIMENSIONALITY REDUCTION FOR REGRESSION

CROSS REFERENCE TO RELATED APPLICATIONS

The present application is a National Stage (§ 371) of International Application No. PCT/EP2019/074086, filed Sep. 10, 2019, which claims the benefit of U.S. Provisional Application No. 62/730,773, filed Sep. 13, 2018, which is incorporated herein by reference.

FIELD OF THE INVENTION

The present invention relates to backpropagation-enabled processes, and in particular, to a method for training a backpropagation-propagation regression process to predict values of an attribute of subsurface data.

BACKGROUND OF THE INVENTION

Backpropagation-enabled machine learning processes offer the opportunity to speed up time-intensive seismic interpretation processes. Many investigators are using field-acquired seismic data for training the backpropagation-enabled processes. In such cases, investigators apply labels to identified geologic features as a basis for training the backpropagation-enabled process.

For example, WO2018/026995A1 (Schlumberger '995) describes a method for "Multi-Scale Deep Network for Fault Detection" by generating patches from a known seismic volume acquired from field data, the known seismic volume having known faults. Labels are assigned to the patches and represent a subset of the training areas in a patch. The patch is a contiguous portion of a section of the known seismic volume and has multiple pixels (e.g., 64×64 pixels). The patch is intersected by a known fault specified by a user. A machine learning model is trained by the label for predicting a result to identify an unknown fault in a target seismic volume.

Waldeland et al also describe using deep learning techniques for seismic data analysis in "Salt classification using deep learning" (79th EAGE Conference & Exhibition, 2017, Paris, France, 12-15 Jun. 2017). As noted by Waldeland et al, deep learning on images is most often done using a group of convolutional neural networks. A group of convolutional neural networks (CNN) is a cascade of convolutions that can be used to construct attributes for solving a problem of classifying salt bodies. With a view to reducing computation time, Waldeland et al train a CNN to classify each pixel in a dataset as either "salt" or "not salt." The CNN is trained on one inline slice of the dataset, and the trained CNN is subsequently used to classify a different slice in the same dataset.

The results on two datasets show that salt bodies can be labeled in 3D datasets using one manually labeled slice. Waldeland et al state that one advantage of using CNN for salt classification is that the input is just a small cube from the raw data, removing the need for attribute-engineering and making it easier to classify any given location in the dataset without computing attribute-sections. A coarse classification is done by evaluating every n-th pixel, while a more refined classification requires evaluating every pixel.

Waldeland et al acknowledge the difficulty of working with full seismic data, which may be 3D, 4D or 5D, for producing a fully classified image. Accordingly, small cubes of input data of dimension 65×65×65 are selected from the full cube of seismic data. The goal is to have the network predicting the class of the center pixel of the small cubes. The network is trained in one manually labeled inline slice (see also Waldeland et al "Convolutional neural networks for automated seismic interpretation" The Leading Edge 529-537; July 2018) with selected 3D cubes around the pixels in the slice. Random augmentation is applied to the training slice to simulate a larger training set by random scaling, random flipping of non-depth axes, random rotation, and random tilting.

While Waldeland et al were motivated to reduce computational time by reducing data to center pixels of a seismic cube, the computational time actually increases significantly when a more detailed and refined classification is required, especially when it is desired to identify the occurrence of other types of subsurface features.

There is a need for a method for training a backpropagation-enabled process for predicting values of an attribute of subsurface data that improves conventional processes by improving accuracy and efficiency, while reducing the need for computational resources.

SUMMARY OF THE INVENTION

According to one aspect of the present invention, there is provided a method for training a backpropagation-enabled regression process for predicting values of an attribute of subsurface data, the method comprising the steps of: inputting a multi-dimensional seismic data set with an input dimension of at least two into a backpropagation-enabled process; computing a predicted value of the attribute, wherein the predicted value has a prediction dimension of at least 1 and is at least 1 dimension less than the input dimension.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

Figure 1:
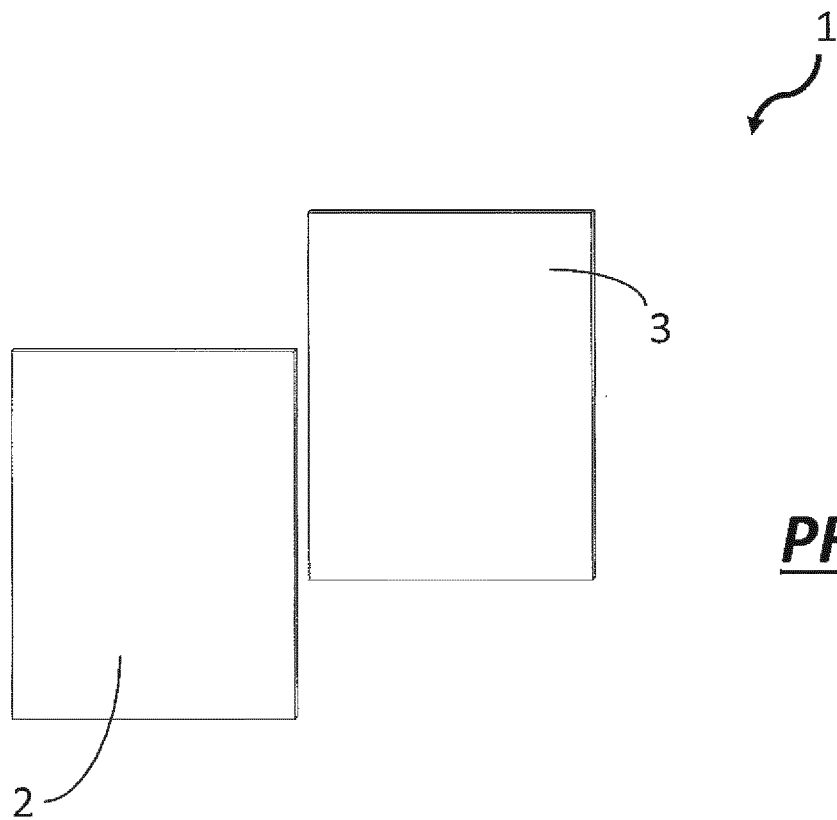
FIG. 1 is a representation of a Prior Art 2D Deep Learning ("DL") input/output pair.

The present invention provides a method for training a backpropagation-enabled regression process for predicting values of an attribute of subsurface data. Examples of attributes of subsurface data include any quantity derived from the input data such as, without limitation spectral content, energy associated with changes in frequency bands, signals associated with filters, including without limitation, noise-free filters, low-pass filters, high-pass filters, and band-pass filters, acoustic impedance, reflectivity, semblance, loop-based properties, envelope, phase, dip, azimuth, curvature and the like.

Analysis of subsurface data, including seismic data, is important for improving efficiency and accuracy of hydrocarbon exploration. However, seismic data is often voluminous and subject to human error in interpretation. For example, in the interpretation of field-acquired data, faults are annotated by drawing a series of straight lines. But the fault may not fall exactly along the straight-line segments or interpreters may inadvertently interpolate segments into a single fault where multiple faults are present. Also, the presence of noise from, for example, seismic acquisition, seismic processing, an imaging process and, often, from combinations thereof, can adversely affect the ability to interpret the prospectivity of the region targeted by the subsurface data collection. In practice, this limitation is overcome by computing attributes from the subsurface data. Accordingly, it would be advantageous to leverage backpropagation-enabled processes for predicting values of an attribute of subsurface data.

Examples of backpropagation-enabled processes include, without limitation, artificial intelligence, machine learning, and deep learning. It will be understood by those skilled in the art that advances in backpropagation-enabled processes continue rapidly. The method of the present invention is expected to be applicable to those advances even if under a different name. Accordingly, the method of the present invention is applicable to the further advances in backpropagation-enabled processes, even if not expressly named herein.

A preferred embodiment of a backpropagation-enabled process is a deep learning process, including, but not limited to a convolutional neural network.

In accordance with the present invention, the method for training the backpropagation-enabled process involves inputting a multi-dimensional seismic data set with an input dimension of at least two into the backpropagation-enabled process. The input multi-dimensional seismic data set may be 2D, 3D, 4D, 5D, and the like. The input 2D data set may, for example, be 2D seismic data or 2D data extracted from seismic data of 3 or more dimensions. Likewise, the input 3D data set may, for example, be 3D seismic data or 3D data extracted from seismic data of 4 or more dimensions. And, input 4D data set may, for example, be 4D seismic data or 4D data extracted from seismic data of 5 or more dimensions.

The multidimensional seismic input data set may include field-acquired data, synthetic data, and combinations thereof.

Once the data is inputted to the backpropagation-enabled process, a predicted value of the attribute is computed. In accordance with the present invention, the predicted value has a prediction dimension of at least 1 and is at least 1 dimension less than the input dimension. In the backpropagation regression process, the predicted value of the attribute is on the same grid as the input data or a subset thereof.

In a preferred embodiment, the input dimension of the multi-dimensional seismic data set is at least 2 and the prediction dimension is 1. An example of a 1-dimensional predicted value is a ribbon, for example representing a line in a 2-dimensional slice or grid. The line may be, for example, a line in an x or y direction. Another example of a 1-dimensional predicted value is a trace, for example, a signal in the z-direction at a single specified xy-value.

In another preferred embodiment, the input dimension of the multi-dimensional seismic data set is at least 3 and the prediction dimension is 1 or 2. In a further preferred embodiment, the input dimension is at least 4 and the prediction dimension is 1, 2 or 3. In yet another preferred embodiment, the input dimension is at least 5 and the prediction dimension is 1, 2, 3 or 4.

Preferably, the predicted value is made on a 1D seismic array from an input dimension of at least 2. More preferably, the predicted value is made on a 2D seismic array from an input dimension of at least 3. In another embodiment, the predicted value is made on a 3D seismic array from an input dimension of at least 4. In yet another embodiment, the predicted value is made on a 4D seismic array from an input dimension of at least 5. Still another embodiment has a predicted value made on a 5D seismic array from an input dimension of at least 6. When the data is larger than 3D, it is generally 3D seismic data with attributes related to seismic survey acquisition or the result of multiple attribute computations. As an example, multiple attributes preferably comprise 3 color channels.

Referring now to the drawings, FIG. 1 illustrates a Prior Art 2D Deep Learning ("DL") input/output pair 1. The DL input/output pair 1 has input data 2 and predicted values 3 that are identically-sized 2D arrays to be used for training. The labels (not shown) in a supervised process are also 2D arrays with the same shape as the input data 2.

Figure 2:
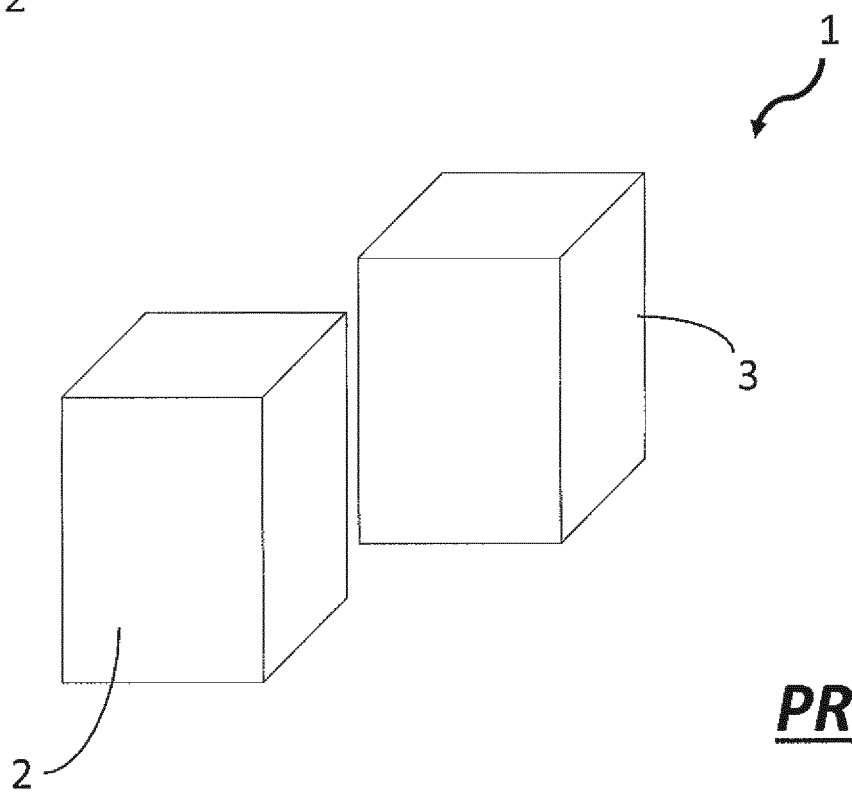
FIG. 2 is a representation of a Prior Art 3D DL input/output pair.

Likewise, FIG. 2 illustrates a Prior Art 3D DL input/output pair 1 having input data 2 and predicted values 3 that are identically-sized 3D arrays to be used for training. The labels (not shown) in a supervised process are also 3D arrays with the same shape as the input data 2.

Figure 3:
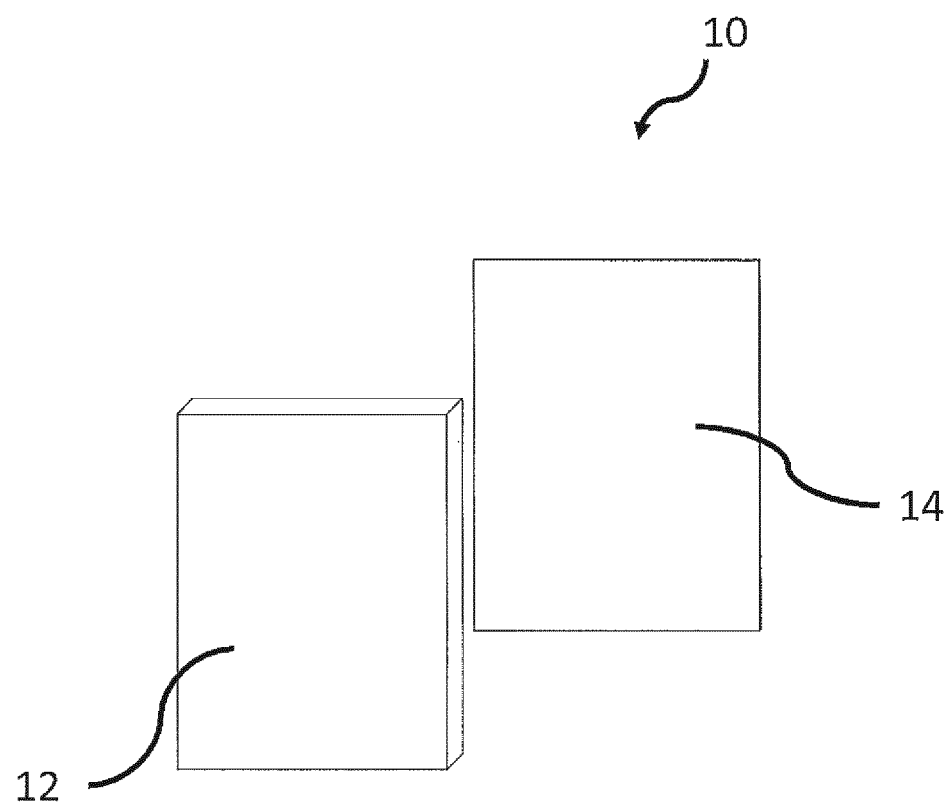
FIG. 3 is a representation of one embodiment of the present invention having a 3D seismic data input and a 2D prediction.

FIG. 3 is a representation of one embodiment of a DL input/output pair for the method 10 of the present invention, wherein the input data 12 and predicted values 14 have different dimensions. Labels (not shown) in a supervised process have same dimensions and shape as predicted values 14. The predicted values 14 have at least one fewer dimension than the input seismic data 12 and are at least 1D.

Figure 4:
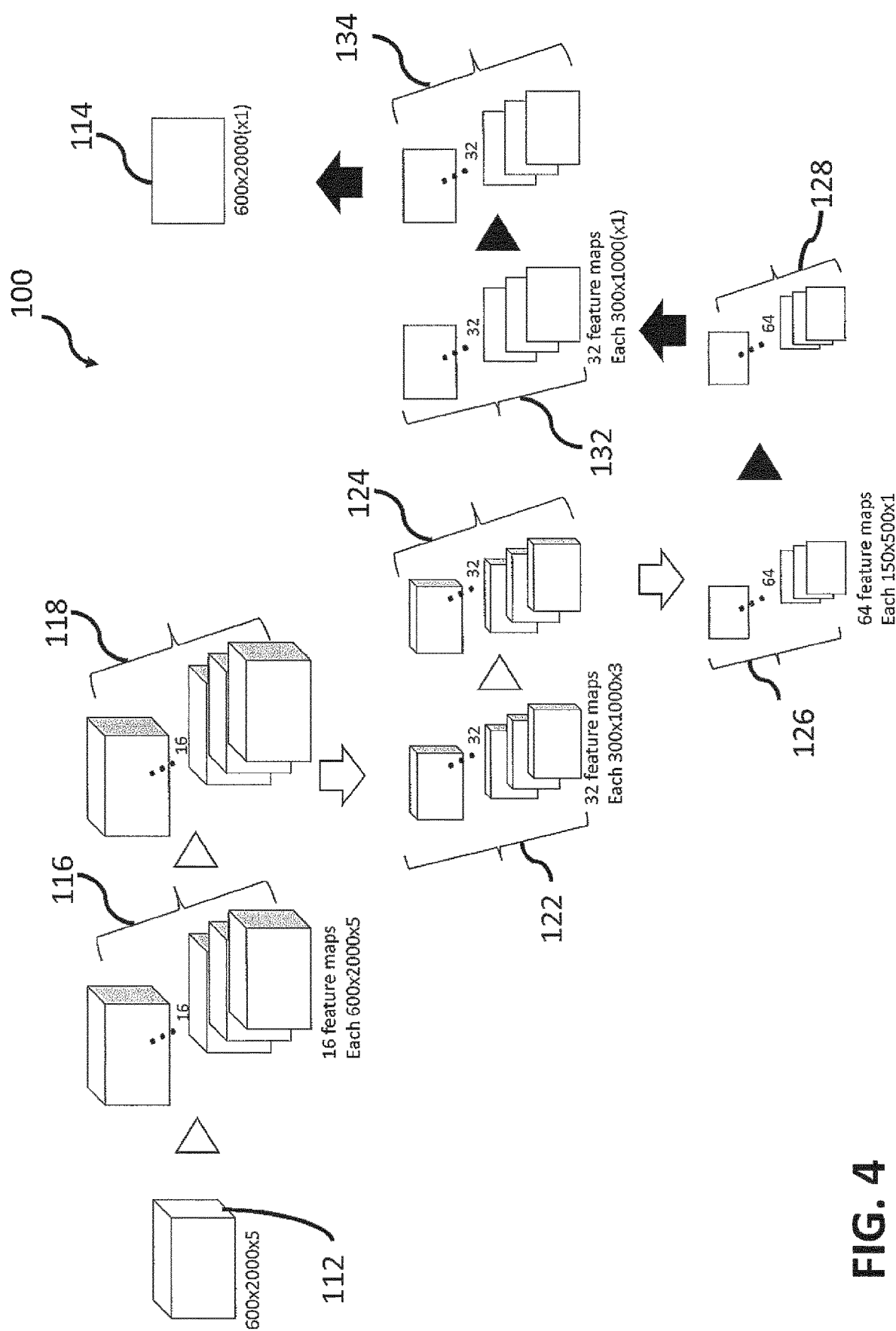
FIG. 4 illustrates another embodiment of the present invention.

FIG. 4 is a representation of another embodiment of a training architecture 100 for a backpropagation-enabled process in the method of the present invention. In the example illustrated in FIG. 4, the open triangles represent 3D convolutions, while the solid triangles represent 2D convolutions. Meanwhile, the open arrows represent downscaling steps, while the solid arrows represent up scaling steps.

A specific example is demonstrated in FIG. 4. However, it will be understood by those skilled in the art that the dimension of the input data, the size/shape of the input data, the number and size of convolutional filters used, the number of convolutions, the number of downscaling steps, the number of upscaling steps, and the number of feature maps created can be different. The multi-dimensional seismic data set is shown as 3D in the example of FIG. 4, but can be 4D, 5D, etc.

For ease of discussion, the size of the input data set and filters for each step was selected to produce feature maps of the same size. However, this is not necessary in accordance with the method of the present invention. Each feature map dimension has a value whose maximum size is identical to the size of the corresponding dimension of its input data set and whose minimum size is the size of the corresponding input data set minus twice the integer value of the half-size of the corresponding dimension of the filter.

As shown in the example of FIG. 4, a multidimensional seismic input data set 112 is 3D with a shape of 600×2000×5 pixels. The input data set 112 is convolved with 16 3D convolutional filters using weights that are learned via backpropagation-enabled deep learning. This creates 16 feature maps 116. In this case, each feature map 116 array has the same dimension as the input data set 112, in this case 600×2000×5. The set of 16 feature maps 116 is then convolved with 16 3D convolutional filters using weights that are learned via back-propagation enabled deep learning, resulting in a set of modified feature maps 118. This step modifies the content of the input feature maps 116 but does not change the dimension or shape.

In a subsequent step, each modified feature map 118 is downscaled to produce a set of 32 feature maps 122. In this example, downscaling involves decimating the modified feature maps 118 in each dimension by outputting every other element to change the shape from 600×2000×5 to 300×1000×3. The set of 32 feature maps 122 is then convolved with 32 3D convolutional filters using weights that are learned via back-propagation enabled deep learning, resulting in another set of modified feature maps 124. This step modifies the content of the input feature maps 122 but does not change the dimension or shape.

Next, the number of feature maps 124 is doubled from 32 to 64 feature maps 126 in a second downscaling step, where the shape of each feature map 124 is decimated by 2, i.e., from 300×1000×3 to 150×500×1. As noted above, the size and shape of the data may be different than shown in FIG. 4. However, in accordance with the present invention, the dimension, n, of the data should be downscaled by an appropriate number of downscaling steps so that at least one, but no more than n−1, of the array dimensions is one. In other words, the feature maps 126 are now 2D, although FIG. 4 shows the feature map with 3 dimensions and shape as 150×500×1 for clarity. When one of the dimensions of the set of feature maps is one element, the number of dimensions is reduced by one, such that the dimension is equally described as a 2D array with shape 150×500. The set of 64 feature maps 126 is then convolved with 64 2D convolutional filters using weights that are learned via back-propagation enabled deep learning, resulting in another set of modified feature maps 128. This step modifies the content of the input feature maps 126 but does not change the dimension or shape.

Each feature map 128 is then upscaled to change the shape from 150×500 to 300×1000 in the set of feature maps 132 by infilling in each dimension plus additional elements between each element in the input 2D array of the set of feature maps 128. The set of 32 feature maps 132 is then convolved with 32 2D convolutional filters using weights that are learned via back-propagation enabled deep learning, resulting in another set of modified feature maps 134. This step modifies the content of the input feature maps 132 but does not change the dimension or shape.

The predicted value 114 output has one (or more) fewer dimensions than the input data 112. As shown in FIG. 4, the shape of the remaining dimensions is the same as the input data—i.e., both are 600×2000. However, the shape of the predicted value 114 may also be smaller in the remaining dimensions, as long as the predicted value 114 is at least 1D. More specifically, a predicted value that is a single pixel or a single voxel is zero D and is outside the scope of the present invention.

The backpropagation-enabled process may be supervised, semi-supervised, unsupervised or a combination thereof. In one embodiment, a supervised process is made semi-supervised by the addition of an unsupervised technique. As an example, the unsupervised technique may be an auto-encoder step.

In a preferred embodiment, the backpropagation-enabled process is a supervised regression process. Preferably, the supervised regression process comprises the step of comparing attributes computed in a conventionally computed technique with the ones from a supervised regression technique.

In another embodiment, the backpropagation-enabled process is an unsupervised regression process, comprising the steps of encoding and clustering the multi-dimensional seismic data.

While preferred embodiments of the present invention have been described, it should be understood that various changes, adaptations and modifications can be made therein within the scope of the invention(s) as claimed below.

What is claimed is:

1. A method for training a backpropagation-enabled regression process for predicting values of an attribute of subsurface data, the method comprising the steps of:
   (a) inputting a multi-dimensional seismic data set with an input dimension, n, of at least two into a backpropagation-enabled process;
   (b) convolving the multi-dimensional seismic data set using convolutional filters learned from the backpropagation-enabled process to produce a set of input feature maps having a convolutional dimension equal to the input dimension;
   (c) downscaling the set of input feature maps to produce a downscaled array of modified feature maps using the convolutional filters learned from the backpropagation-enabled process, so that at least one, but no more than n−1, dimension of the downscaled array is one;
   (d) upscaling the downscaled array to produce an upscaled array of further modified feature maps using the convolutional filters learned from the backpropagation-enabled process, wherein the upscaled array has the same dimension of the downscaled array, and
   (e) computing a predicted value of the attribute from the upscaled array, wherein the predicted value has a prediction dimension of at least 1 and is at least 1 dimension less than the input dimension.

2. The method of claim 1, wherein the input dimension is at least 2, and the prediction dimension is 1.

3. The method of claim 1, wherein the input dimension is at least 3, and the prediction dimension is selected from the group consisting of 1 and 2 dimensions.

4. The method of claim 1, wherein the input dimension is at least 4, and the prediction dimension is selected from the group consisting of 1, 2 and 3 dimensions.

5. The method of claim 1, wherein the input dimension is at least 5, and the prediction dimension is selected from the group consisting of 1, 2, 3 and 4 dimensions.

6. The method of claim 1, wherein the multi-dimensional seismic data is selected from the group consisting of 2D seismic data and 2D data extracted from seismic data of 3 or more dimensions.

7. The method of claim 1, wherein the multi-dimensional seismic data set is selected from the group consisting of 3D seismic data and 3D data extracted from seismic data of 4 or more dimensions.

8. The method of claim 1, wherein the multi-dimensional seismic data set is selected from the group consisting of 4D seismic data and 4D data extracted from seismic data of 5 or more dimensions.

9. The method of claim 1, wherein the multi-dimensional seismic data set comprises multiple attributes.

10. The method of claim 9, wherein the multiple attributes comprise 3 color channels.

11. The method of claim 1, wherein the predicted value is made on a 1D seismic array from an input dimension of at least of 2.

12. The method of claim 1, wherein the predicted value is made on a 2D seismic array from an input dimension of at least 3.

13. The method of claim 1, wherein the predicted value is made on a 3D seismic array from an input dimension of at least 4.

14. The method of claim 1, wherein the predicted value is made on a 4D seismic array from an input dimension of at least 5.

15. The method of claim 1, wherein the predicted value is made on a 5D seismic array from an input dimension of at least 6.

16. The method of claim 1, wherein the backpropagation-enabled process is a deep learning process.

17. The method of claim 1, wherein the backpropagation-enabled process is a supervised regression process, comprising the step of comparing attributes computed in a conventionally computed technique with the ones from a supervised regression technique.

18. The method of claim 1, wherein the backpropagation-enabled process is selected from the group consisting of supervised, semi-supervised, unsupervised processes and combinations thereof.

19. The method of claim 1, wherein the multidimensional seismic data set is comprised of seismic data selected from the group consisting of field-acquired data, synthetic data, and combinations thereof.

* * * * *